No. 735,807. PATENTED AUG. 11, 1903.
J. PETERSON.
MANURE GATHERER AND LOADER.
APPLICATION FILED AUG. 20, 1902.
NO MODEL. 3 SHEETS—SHEET 2.
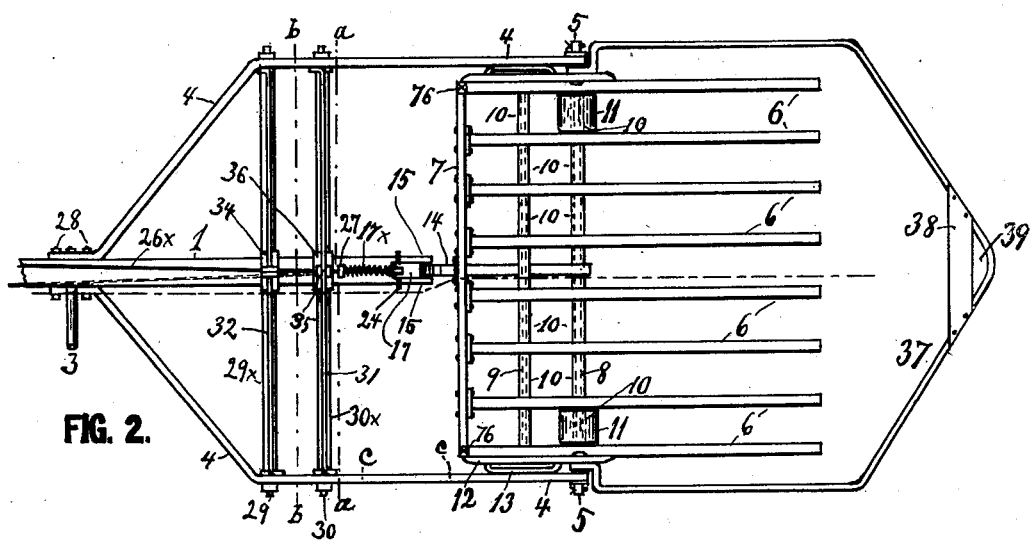
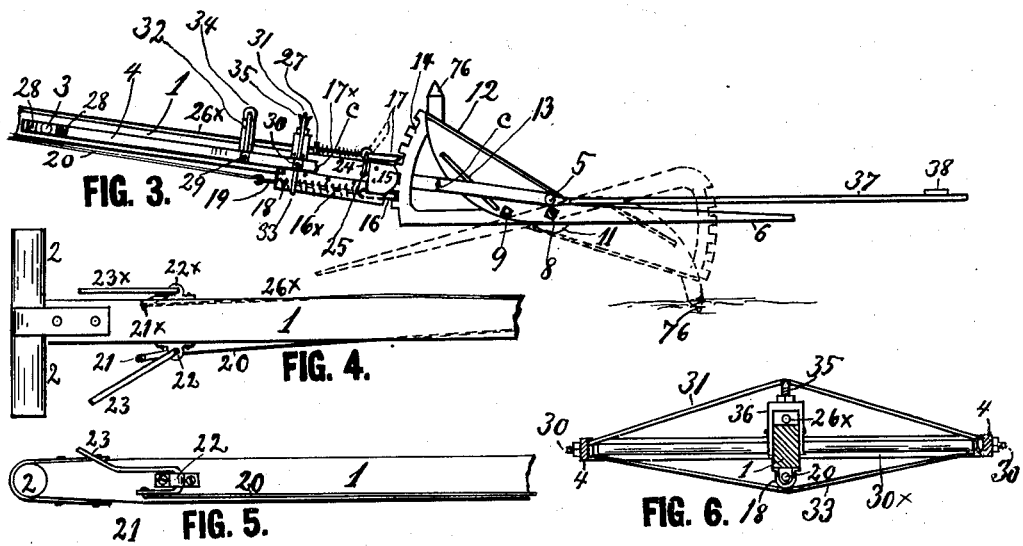
WITNESSES:
D. E. Carlsen
E. C. Carlsen
INVENTOR:
John Peterson
BY his ATTORNEY:
A. M. Carlsen No. 735,807. PATENTED AUG. 11, 1903.
J. PETERSON.
MANURE GATHERER AND LOADER.
APPLICATION FILED AUG. 20, 1902.
NO MODEL. 3 SHEETS—SHEET 3.
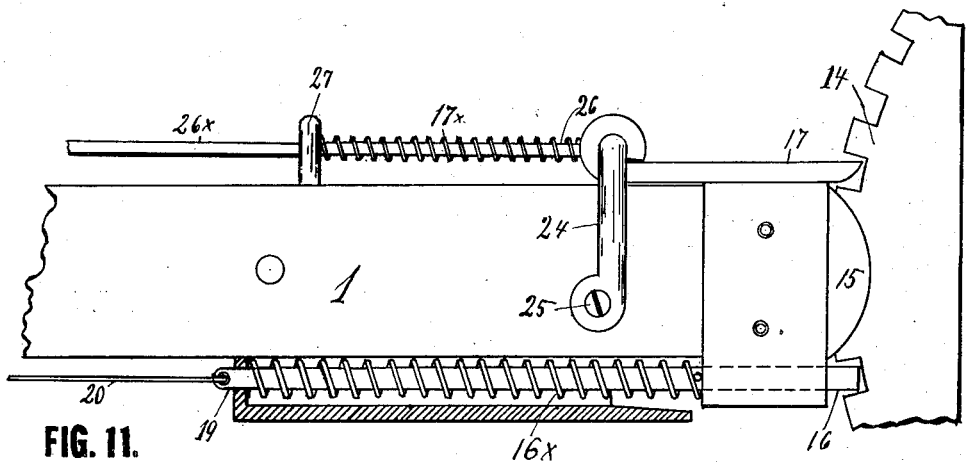
FIG. 11.
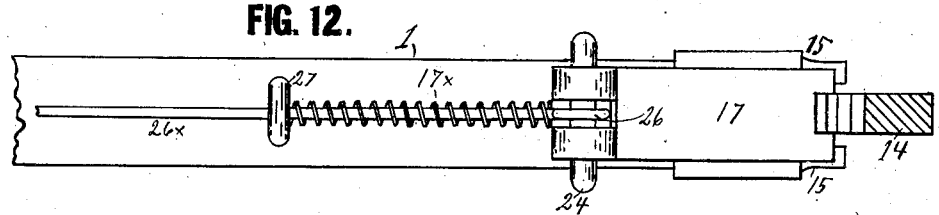
FIG. 12.
FIG. 13. FIG. 14.
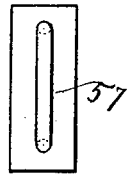
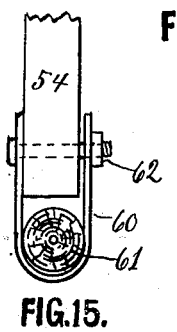
FIG. 15.
WITNESSES:
E. C. Carlsen.
D. E. Carlsen.
INVENTOR.
John Peterson
BY his ATTORNEY:
A. M. Carlsen.

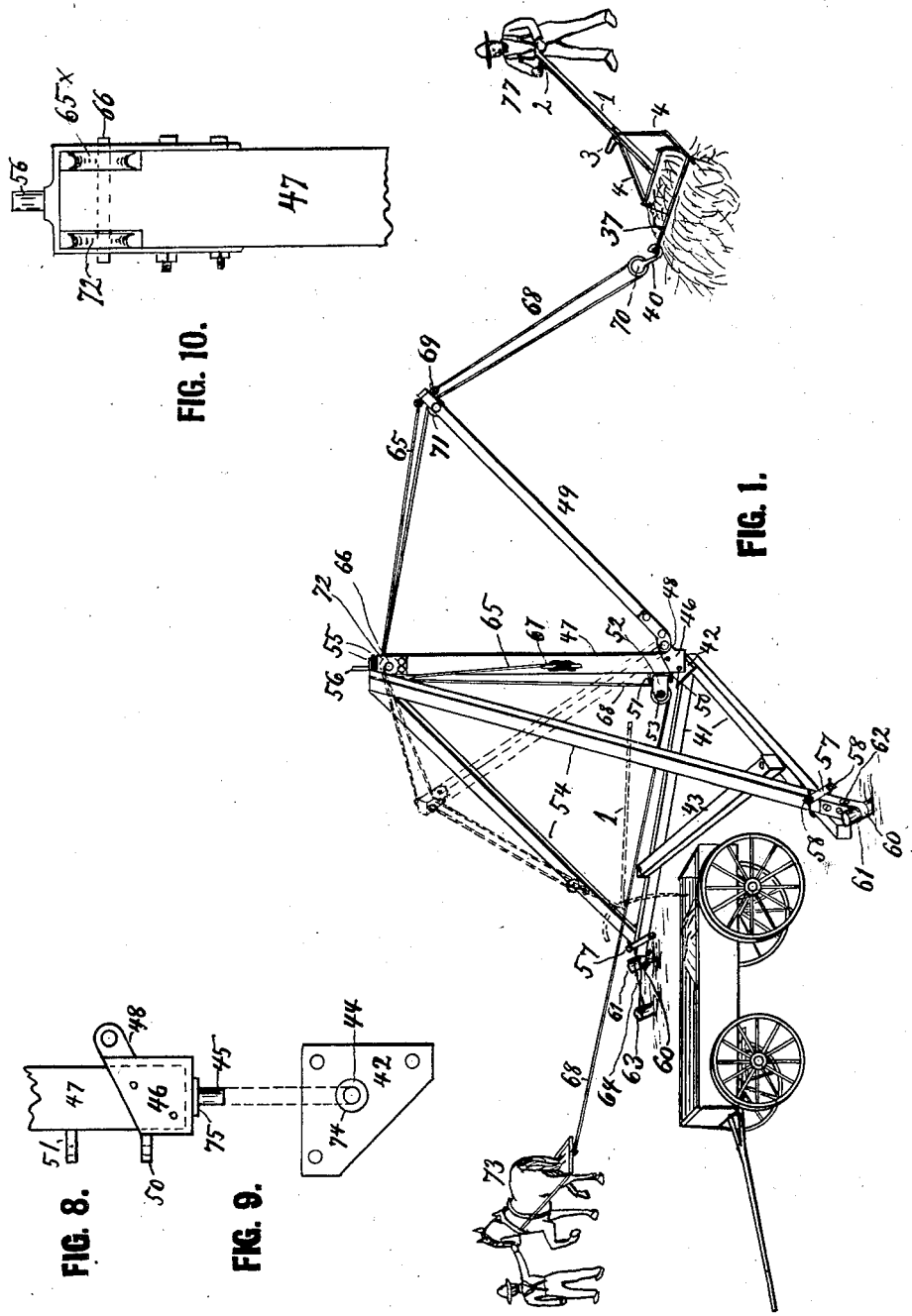

No. 735,807. Patented August 11, 1903.

UNITED STATES PATENT OFFICE.

JOHN PETERSON, OF ST. PAUL, MINNESOTA.

MANURE GATHERER AND LOADER.

SPECIFICATION forming part of Letters Patent No. 735,807, dated August 11, 1903.

Application filed August 20, 1902. Serial No. 120,351. (No model.)

*To all whom it may concern:*

Be it known that I, JOHN PETERSON, a citizen of the United States, residing at St. Paul, in the county of Ramsey and State of Minnesota, have invented certain new and useful Improvements in Manure Gatherers and Loaders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to manure gatherers and loaders, and particularly to the class wherein a fork or shovel device is provided and operated by a suitable hoisting apparatus.

The primary object of the invention is to provide various improvements over the constructions described in Letters Patents of the United States granted to me September 13, 1898, No. 610,609, and November 12, 1901, No. 686,532.

The various improvements will be clearly pointed out in the below description and claims, reference being had to the accompanying drawings, in which—

Figure 1 is a perspective view of the complete apparatus as when in use. Fig. 2 is a top view of the shovel and a portion of its handle. Fig. 3 is a side view of the parts shown in Fig. 2 with a piece partly broken away between $c$ and $c$. Fig. 4 is a top view of the rear portion of the handle. Fig. 5 is a side view of the part shown in Fig. 4. Fig. 6 is a cross-section on the line $a\ a$ of Fig. 2 looking from right to left. Fig. 7 is a cross-section on the line $b\ b$ of Fig. 2. Fig. 8 is a side view of the lower end of the mast of the hoisting device. Fig. 9 is a top view of the plate supporting the mast, and Fig. 10 is a front view of the top of the mast. Fig. 11 is an enlarged side view of the main parts to the left in Fig. 3 with the shell $16^\times$ in section. Fig. 12 is a top view of the parts shown in Fig. 11. Fig. 13 is an enlarged side view, and Fig. 14 a rear view, of the clamping-clip 57. Fig. 15 is an enlarged top view of one of the anchoring-pegs with the clamp 60 and a fraction of the frame-timber secured thereby.

Referring to the drawings by reference-numerals, 1 designates the beam or operating handle of the shovel or fork provided at its rear end with a T-handle 2, while nearer to the front end is a side handle 3, which is sometimes useful in controlling the fork. Near said handle 3 are secured to the beam 1 the diagonally and forwardly extending arms 4, forming a frame in whose front ends are journaled the trunnions 5, projecting from the fork proper, which tilts on said trunnions, and consists of a series of tines 6, connected together at their upturned rear ends by the bar 7 and strengthened by two cross-rods 8 and 9, each of which is encircled between the tines by pieces of tubing 10, forming supports between the tines when a nut at the end of each rod draws the tines firmly together to make the fork rigid. Upon two of said tubings revolve two rollers 11, which serve as supporting-wheels for the fork upon the ground.

12 represents cheek-pieces secured to so as to strengthen the curved rear portion of the fork and to guard to some extent the load from falling out at the sides.

13 represents guides secured at the sides of the fork near its corners for the arms 4 to prevent side strain on the toothed sector 14 at the rear of the fork, which is guided between the side lips 15 of the front end of the beam 1 and is engaged by two sliding catches 16 and 17, having each a rod with a coil-spring $16^\times$ and $17^\times$, respectively, tending to hold the catches normally engaged with the teeth of the sector. The catch 16 is of the common sliding form. It slides in a shell 18, which protects the spring against dirt and damage from contact. From the rear end 19 of this catch extends the wire or light rod 20 to the short arm 21 of a lever 21 23, fulcrumed at 22 near the rear end of the beam 1 and having its long arm 23 serving as a handle. When this handle is brought close to the beam, it becomes spring-held against the latter by the action of the spring $16^\times$ pulling on the arm 21, which approaches the beam in advance of the long arm 23, and thus get inward past the fulcrum 22, so that the latch 16 may at any time be locked in a disengaged position from the sector 14. The upper catch 17 is pivotally placed on a clevis 24, pivoted at 25 to the beam. The front end of this catch is beveled, so that it will play downward over the teeth, causing the spring 17$^\times$ to yield and take hold of the teeth only when impelled upward. In a notch in the rear end of the catch 17 is attached to the clevis 24 a rod 26, which passes through the spring 17$^\times$, is guided at 27, and by the wire or rod 26$^\times$, connected to the short arm 21$^\times$ of the lever 21$^\times$ 23$^\times$, fulcrumed at 22$^\times$ at the opposite side of the beam from the lever 21 23. The function of the two opposite levers is similar and is already described about latch 16.

The frame-arms 4 are strongly secured to the beam not only by the bolts 28, but also by the rods 29 and 30 with tubes 29$^\times$ and 30$^\times$, interposed thereon between the beam and the arms 4 and the upper braces 31 and 32, one on each of them, and the brace 33 at the bottom of one of them.

34 is a bridge supporting the brace 32 over the rod 26$^\times$, while the lower brace 32 bears against the shell 18, and the brace 31 is supported on the grooved head of a tension-screw 35, placed in the clevis 36, bridging over the sliding rod 26$^\times$.

The trunnions 5 are secured on the cheek-pieces 12 slightly above the rod 8, so that the fork has a tendency to tilt forward when the bail 37, pivoted on the trunnions, pulls forwardly, as shown to the right in Fig. 1.

38 is a bracing-plate secured across the front junction of the bail to stiffen it and to create an eye 39 for the hook 40 of the hoisting device forming a portion of the apparatus and which will now be described.

While the hoisting-machine may be of various forms and arrangements, as indicated in my former patents above referred to, I prefer the portable hoisting device illustrated in Fig. 1 and comprising two horizontal base timbers or bars 41, secured together at one end by the step-plate 42 and held at about right angle to each other by the horizontal brace 43. In the step 44 (best shown in Fig. 9) I place the journal 45, formed on a casting 46, on which the lower end of the mast 47 is secured. This socket-shaped casting 46 is formed with a projection 48, to which is pivoted the lower end of the boom 49 and opposite thereof with a projection 50, between which and the eyebolt 51, secured in the mast, is pivoted to swing horizontally the sheave-hood 52, having the sheave 53. The mast is held in its upright position by the diagonal braces 54, which have their upper ends provided with journal-plates 55 for the top journal 56 of the mast and their lower ends secured by the clips 57 to the base-timbers 41, so that by loosening the nuts 58 of the clips the base-timbers may be adjusted to possible inclines of the ground without throwing the mast out of its plumb position. The adjustability also enables the mast to be sufficiently leaned toward the wagon or other depositing place, so as to give the fork and boom a tendency to approach that place when raised with the load on it.

To the lower ends of each of the timbers 54 are pivoted loosely the ends of a U-shaped clamp or strap 60, adapted to embrace the posts or anchoring-pins 61, driven in the ground and to be clamped thereon by drawing tight the nut 62 at the end of the pivot-bolt, since the timber 54 is smaller than the post 61.

63 represents an auxiliary post, over which and the post 61 a rope or chain 64 may be tied as a further safeguard against accidental loosening of the hoisting-frame from the ground-posts.

The boom 49 is adjustably held in the desired inclined position by the cable 65, extending from the top of the boom over a sheave 65$^\times$ on the pin 66 in the top of the mast and downward and adjustably secured on a cleat 67 on the mast. Another cable 68 is secured with one end at 69 to the boom, is passed thence over the sheave in the hook-block 70, thence over a sheave 71 in the top of the boom, thence over a sheave 72 in the top of the mast, thence downward and over the sheave 53, from which it passes to any suitable source of power, which in the present drawing is indicated by a horse 73.

In Figs. 8 and 9 is shown that the plate 42 and casting 46 are both provided with integral wearing-collars 74 75, so that the castings proper will not come together and cause undue friction even after much wear.

The two outer tines of the fork have their upwardly-turned rear ends formed into projecting points or horns 76, adapted to take hold in the ground or of other objects and turn the fork on its trunnions if it should happen to get on a dead-center with its bottom up. When not on such dead-center its normal tendency is to hang on the trunnions with the toothed sector toward the catches 16 and 17.

In further describing the operation of the device it will be understood that the apparatus is used for raking together and depositing in a wagon or in heaps manure and other substances by swinging the boom 49 in any desired direction and pulling the fork on its wheels or rollers 11 to the various parts of the ground upon a large area, and whenever the fork gets full or loaded the animal 73 (or other power) draws it under the outer end of the boom and raises it high enough to empty the load upon a wagon or other place of deposit, over which it is easily swung by the operator 77, especially if the mast inclines some toward that place. In emptying the fork the operator usually simply pulls the lever 23 so as to unlock the catch 16 and the load will tilt the fork forward and empty it; but if the load happens to be evenly balanced or even heaviest back of the trunnions 5, then the lever 23 is thrown close to the beam 1, where it is spring-held, as described, and the operator gives an upward jerk with the beam 1. This causes the rear part of the fork and load, now supported only by the catch 17, to flap said catch upwardly and tilt forwardly and unload. When the largest possible portion of the ground has thus been operated on, the anchoring-pins are released and removed to the next portion of the ground to be operated on, and to that place the hoisting device is pulled by hitching the horse to it near the base of the mast, the base-timbers 41 serving as runners, or if the ground is uneven one of said timbers may be raised partly from the ground and supported by a walking person during the short drive.

Having thus described my invention, what I claim, and desire to secure by Letters Patent, is—

1. The combination with a base and a mast journaled loosely thereon, of diagonal braces forming journal-bearing for the top of the mast, and clevises securing the lower ends of the braces to the base in an adjustable manner.

2. The combination with the mast 49 of the socket 46 secured on the lower end thereof and having the journal 45 at its base and the projections 48 and 50 at opposite sides of the socket, substantially as and for the purpose set forth.

3. The combination with the base of a hoisting device, of anchoring-pins adapted to be driven into the ground, U-shaped clamps embracing the pegs or pins, and a clamping-bolt pivoting the ends of the clamp to the base in a manner allowing the clamp to pinch the pin when the bolt is tightened.

4. The combination with the base of a hoisting device, of anchoring-pins adapted to be driven into the ground, U-shaped clamps embracing the pins, and a clamping-bolt pivoting the ends of the clamp to the base in a manner allowing the clamp to pinch the pin when the bolt is tightened, and an auxiliary pin near the main anchoring-pin, and a chain or rope tied over the two pins.

5. The combination with a handle or beam 1, of frame-arms 4 and a tilting fork trunnioned therein, the two cross-bars 29 and 30 passed through the beam and secured to the arms 4 one forward of the other, and means for holding the fork in various positions.

6. The combination with a handle or beam 1, of frame-arms 4 and a tilting fork trunnioned therein, the two cross-bars 29 and 30 passed through the beam and secured to the arms 4 one forward of the other, and means for holding the fork in various positions, and braces 31 32 33 crossing over and under the beam, and having their ends secured near the ends of the rods and means supporting the braces by the beam.

7. The combination with a handle or beam 1, of frame-arms 4 and a tilting fork trunnioned therein, the two cross-bars 29 and 30 passed through the beam and secured to the arms 4 one forward of the other, and means for holding the fork in various positions, and braces 31 32 33 crossing over and under the beam, and having their ends secured near the ends of the rods, means supporting the braces on the beam and the tension-screw 31 serving as a brace-stretcher.

8. The combination with the handle bar or beam 1, of the arms 4 and the guiding-lips 15, a tilting fork trunnioned in the arms 4, the toothed sector 14 at the rear of the fork passing between said lips, and catches adapted to engage the sector when in that position and means for operating the catches.

9. The combination with the handle bar or beam 1 and suitable frame-arms extending from the front end thereof, of a tilting fork trunnioned in said arms and having a toothed sector at its rear end, the two spring-pressed catches 16 and 17 engaging said sector, and means for withdrawing and locking either of said catches in a disengaged position.

10. The combination with a suitable handle bar or beam, of frame-arms extending from the front end thereof, a tilting fork trunnioned in the arms and means for locking the fork in its normal position detachably to the beam, the trunnions of the fork being so disposed that the weight of the fork tends to bring it into the normal position.

11. The combination with a suitable handle bar or beam, of frame-arms extending from the front end thereof, a tilting fork trunnioned in the arms and means for locking the fork in its normal position detachably to the beam, the trunnions of the fork being so disposed that the weight of the fork tends to bring it into the normal position, and the points or horns 76 at the top of the rear part of the fork.

12. In a manure gatherer and loader, the combination with a suitable handle bar or beam and frame-arms extending forward from the same, of a tilting fork trunnioned in the arms, ground wheels or rollers 11 supporting the fork, a bail 37 pivotally placed upon the trunnions, and means for detachably holding the fork in various positions on the trunnions.

13. In a manure gatherer and loader, the combination with a suitable handle bar or beam and frame-arms extending forwardly from the same, of a tilting fork trunnioned in the arms, ground wheels or rollers 11 supporting the fork, a bail 37 pivotally placed upon the trunnions, and means for detachably holding the fork in various positions on the trunnions, said trunnions being disposed above the central line of the rollers.

14. The combination with the handle bar or beam 1, of the arms 4 and lips 15 projecting therefrom, of a tilting fork trunnioned in the arms and having the sector 14 guided by the lips 15, and the guides 13 guiding against the arms 4, and means for locking the sector at various elevations.

15. The combination with the handle bar or beam having frame-arms 4, of a tilting fork trunnioned in said arms and having the toothed sector 14, a spring-pressed catch or sliding bolt arranged on the beam to engage the teeth of the sector, a shield or housing secured to the beam and covering the spring and catch to protect the same, and means for operating the catch.

16. The fork comprising a series of tines 6, curved upwardly at the rear ends, the bar 7 uniting said rear ends, the two bars or rods 8 and 9 passed transversely through the bodies of the tines at various points and drawn tight, and interposed tubular resisting-pieces 10 on the rods between the tines.

In testimony whereof I affix my signature in presence of two witnesses.

JOHN PETERSON.

Witnesses:
A. M. CARLSEN,
D. E. CARLSEN.